United States Patent
Bonfanti

(10) Patent No.: US 7,080,732 B2
(45) Date of Patent: Jul. 25, 2006

(54) GOLF BAG

(76) Inventor: Lorenzo Bonfanti, 6 Via Silvio Pellico, Usmate (IT) 20040

( * ) Notice: Subject to any disclaimer, the term of this patent is extended or adjusted under 35 U.S.C. 154(b) by 147 days.

(21) Appl. No.: 10/466,187

(22) PCT Filed: Jan. 29, 2002

(86) PCT No.: PCT/EP02/00883

§ 371 (c)(1), (2), (4) Date: Jul. 14, 2003

(87) PCT Pub. No.: WO02/062429

PCT Pub. Date: Aug. 15, 2002

(65) Prior Publication Data

US 2004/0050729 A1  Mar. 18, 2004

(30) Foreign Application Priority Data

Feb. 6, 2001  (IT) .......................... MI2001A0235

(51) Int. Cl.
*B63B 55/00*  (2006.01)

(52) U.S. Cl. ................ 206/315.3; 206/315.7; 280/DIG. 6

(58) Field of Classification Search ............ 206/315.7, 206/315.3, 315.6; 280/DIG. 6
See application file for complete search history.

(56) References Cited

U.S. PATENT DOCUMENTS

| | | | | |
|---|---|---|---|---|
| 1,227,657 A | * | 5/1917 | Pierce | ...................... 206/315.6 |
| 2,428,954 A | * | 10/1947 | Apblett et al. | ................. 280/40 |
| 4,400,006 A | | 8/1983 | Larkin | |
| 4,522,299 A | * | 6/1985 | Clark et al. | .............. 206/315.3 |
| 5,470,095 A | | 11/1995 | Bridges | |
| 5,478,097 A | | 12/1995 | Forma | |
| 5,624,028 A | * | 4/1997 | Shin et al. | ................ 206/315.6 |
| 5,868,247 A | * | 2/1999 | Schrader | ................... 206/315.4 |
| 6,050,592 A | * | 4/2000 | Kim | ............................ 280/652 |
| 6,186,522 B1 | * | 2/2001 | Weis | ............................ 280/37 |

* cited by examiner

*Primary Examiner*—Tri Mai
(74) *Attorney, Agent, or Firm*—Young & Thompson

(57) ABSTRACT

A bag for golf clubs, of the type comprising an enclosure (1) for containing the clubs (2), a substantially rigid support structure (4) with, fixed thereto, members (5) for connecting wheels (6) to said enclosure to enable the bag to be moved, and a handle (7) for dragging and guiding the bag, said connection members (5) being movable between a rest position (R) and an operative position (P) in which, respectively, the wheels lie in proximity to said enclosure (1) or are distanced from said enclosure, substantially rigid containing elements (4D) for at least partly housing the wheels (6) when these are in the rest position (R), and at least one substantially rigid base wall (4B) of said enclosure (1), and in which in order not to limit the capacity of said enclosure said protection elements (4D) are provided external to said enclosure (1) and said connection elements (5) and said enclosure (1) are shaped such that, when in the rest position (R), the connection elements (5) are positioned external to said enclosure (1).

3 Claims, 2 Drawing Sheets

GOLF BAG

CROSS REFERENCE TO RELATED APPLICATION

This is the 35 USC 371 national stage of international application PCT/EP02/00883 filed on Jan. 29, 2002, which designated the United States of America.

FIELD OF THE INVENTION

Background of the Invention

The present invention relates to a golf bag of the type indicated in the pre-characterising part of the main claim.

Known bags comprising a trolley for transporting the bag (see for example U.S. Pat. No. 4,400,006, U.S. Pat. No. 4,911,465, U.S. Pat. No. 5,470,095, U.S. Pat. No. 4,911,465 or U.S. Pat. No. 5,435,546) present numerous drawbacks. In this respect, some of these bags enable only wheels of relatively small diameter or thickness to be used, so considerably limiting the facility for moving the bag along rough ground. Other known bags comprise housings for the wheels when these are in a non-operative position, so limiting the bag capacity because the wheels and the members connecting them to the bag are located in that part of the bag usually used to house the clubs. Moreover as the wheels are generally not protected when in their non-operative position, they can soil the bag user or the spot on which it is rested.

Other drawbacks of known bags are related to their relative instability when the wheels are in a non-operative position and the discomfort involved in carrying them on the shoulder.

Known bags are also generally difficult to construct and assemble, because they comprise a rigid support structure of complicated form, and/or complicated or difficultly usable members for connecting the wheels to said structure.

SUMMARY OF THE INVENTION

An object of the present invention is to provide a bag comprising a trolley for its transport, in which said trolley in no way limits the bag capacity and enables wheels of suitable diameter to be used, and which can be carried on the shoulder even when the wheels are not clean, its shoulder use being comfortable by virtue of the rigid structure of the bag, which is of simple construction, easy assembly and of pleasing appearance.

This and further objects which will be apparent to an expert of the art are attained by a bag in accordance with the characterising part of the main claim.

BRIEF DESCRIPTION OF THE DRAWINGS

The present invention will be more apparent from the accompanying drawings, which are provided by way of non-limiting example and in which.

DETAILED DESCRIPTION OF THE INVENTION

Figure 1:
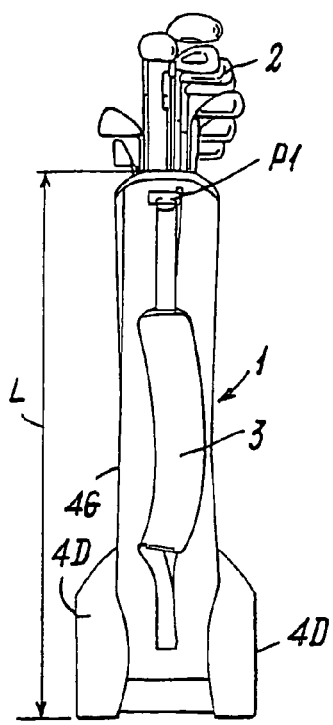
FIGS. 1, 2, 3 are side views of a bag according to the invention.
Figure 2:
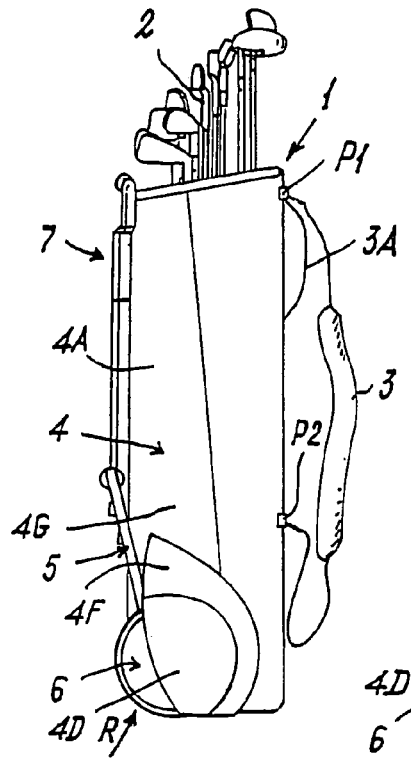
Figure 3:
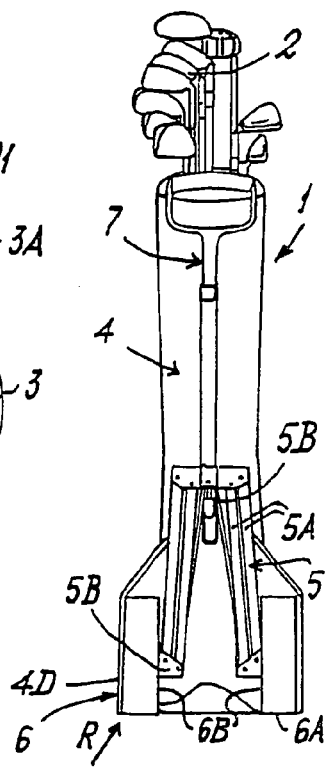

With reference to said figures a bag according to the invention comprises an enclosure, indicated overall by 1, for containing golf clubs 2, a shoulder strap 3 for carrying the bag on a shoulder, and a substantially rigid support structure 4 carrying members 5 for connecting wheels 6 to the bag, and a handle 7.

Figure 4:
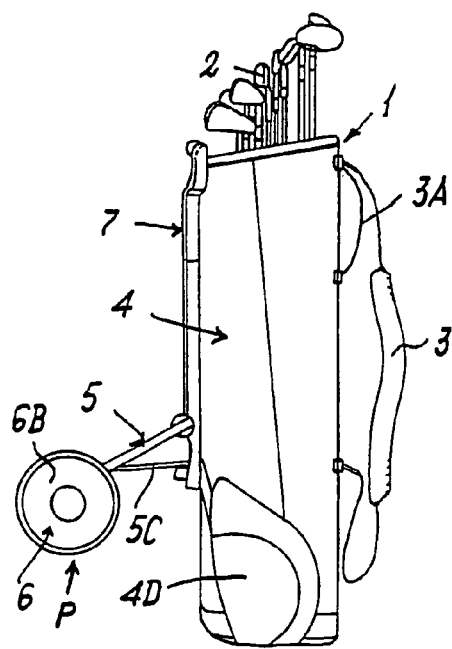
FIGS. 4, 5 are side views thereof in two different operative positions.
Figure 5:
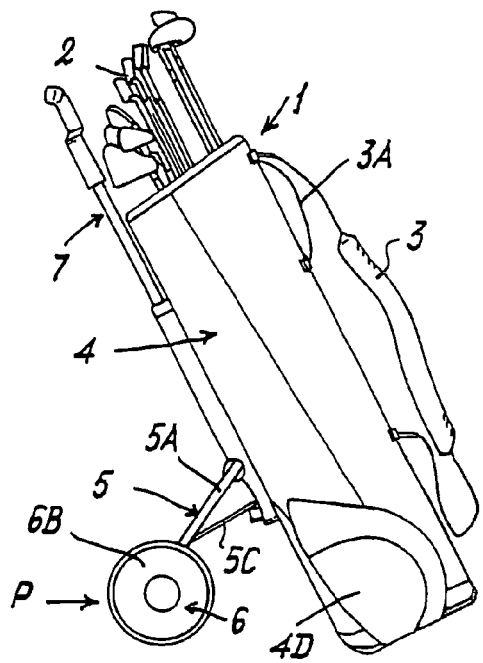
Figure 6:
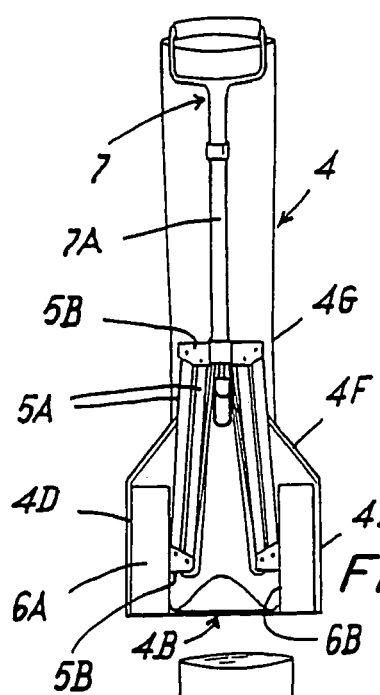
FIGS. 6, 7, 8, 9 are side views of certain details thereof.
Figure 7:
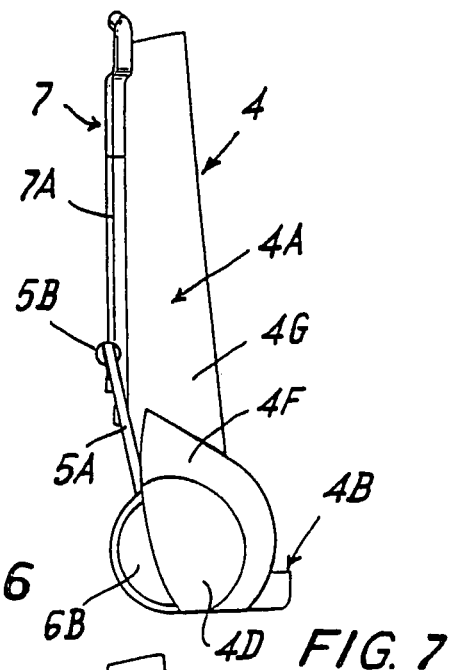
Figure 8:
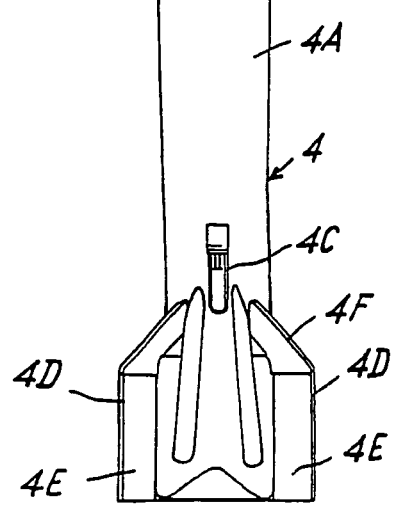
Figure 9:
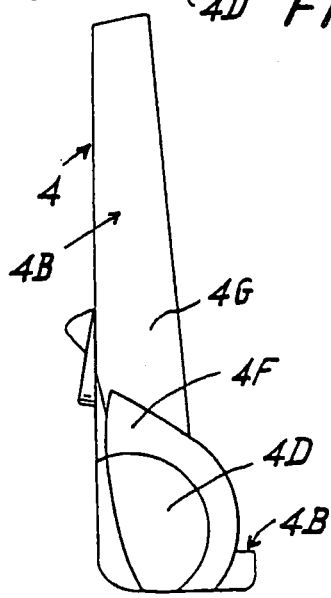

More specifically, the enclosure 1 for containing the golf clubs 2 comprises a first part 1A constructed preferably of an at least partly flexible material, and a substantially rigid second part, bounded by the support structure 4. This structure 4, as shown in FIGS. 4 and 8, preferably has a cross-section of arcuate shape, and presents a wall 4A laterally bounding a portion of the bag, and a lower wall 4B forming a base wall for the bag. The structure 4 preferably extends along the entire length L of the bag and presents in its central part a projecting seat 4C for securing the members 5 for connecting the wheels 6 to the bag. The preferably telescopic handle 7 of usual type, housed in a holder 7A, is secured to the structure along its central outer portion. The handle is shaped to enable it to be positioned substantially flush with the edge of the bag or projecting from this edge so that the bag can be dragged and guided when the wheels are in an operative position. On its base wall 4B, the structure 4 also presents two containing elements or shells 4D, provided external to the structure 4 and arranged to house the wheels 6 when these are in a non-operative position. The two shells 4D together with a portion of the lateral wall of the structure 4 define two seats 4E for containing about three-quarters of the wheels 6 when these are in a non-operative position, and in particular the contour 6A of the wheels and their two lateral faces GB. The shells 4D are open at the base of the bag so that when the wheels are in a non-operative position, they rest on the ground and are flush with the base wall 4B of the structure 4. It should be noted that as the shells 4D are provided on the outside of the wall 4A bounding the bag, they in no way prejudice the bag capacity. Moreover, by virtue of the shells 4D, the bag user protects the wheels while the bag is being transported on the shoulder or when rested, and at the same time limits any drawbacks related to the presence of the wheels, such as those related to the fact that the wheels may be soiled or become trapped. The shells 4D also present a rounded upper wall 4F which blends into a flat portion 4G of the lateral wall 4A of the structure 4 to facilitate transportation of the bag on the shoulder. The structure 4 is preferably constructed in one piece from a rigid semi-expandable structural plastic material such as semi-expandable polystyrene of EDISTIR RV type, by injection moulding. The flexible part 3 of the bag is also preferably constructed of plastic material, for example polypropylene, by injection moulding, then covered with fabric, leather or other usual materials. The members 5 connecting the wheels 6 to the bag are of conventional compass type, and will not be described in detail, they comprise for each wheel two tubular elements 5A which together with end joints 5B form a parallelogram structure which also comprises tensioning rods 5C. As shown in FIGS. 2–5 the connection members 5 enable the wheels 6 to be moved from a rest position (FIGS. 2–3) in which they are housed in the seats defined by the shells 4D, to an operative position P (FIGS. 4–5) in which the wheels project from the bag and together with the connection members form a trolley for transporting the bag. The shoulder strap 3 is also of usual type and is secured to the bag in two positions P1, P2 (FIG. 2) displaced by about 90° from the radiused walls 4F, 4G of the shells 4D and of the lateral wall 4A of the rigid structure 4 of the bag, in order to enable the bag to be properly and comfortably rested on the shoulder of the person transporting it. Moreover, because of the presence of the shells 4D the wheels 6, even if not clean, do not soil the person carrying the bag on his shoulder.

Figure 10:
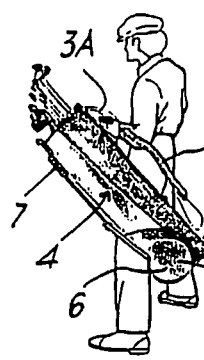
FIGS. 10, 11, 12 are perspective views showing three possible methods of use.
Figure 11:
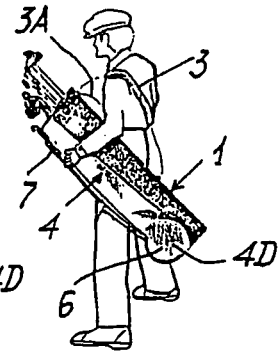
Figure 12:
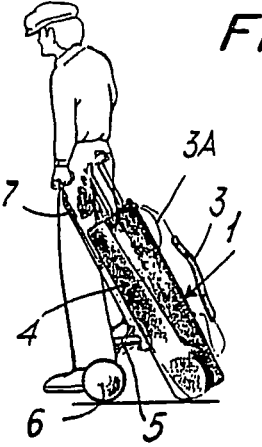

In addition to the shoulder strap 3 the bag also presents a handle 3A. FIGS. 10–12 show three possible ways of transporting the bag, namely by hand, on the shoulder or by dragging it via the wheels 6.

Finally it should be noted that the aforedescribed embodiment is provided by way of example and that numerous variants are possible, all falling within the same inventive concept; for example, the shells 4D, the base 4B and the lateral wall 4A could be constructed separately and then secured to the bag enclosure 1 in usual manner.

The invention claimed is:

1. A bag for golf clubs, comprising:
   an enclosure for containing the clubs, an exterior of the enclosure defining a substantial portion of an exterior surface of the bag;
   a substantially rigid support structure having connection members fixed thereto; said connection members connecting wheels to an exterior face of said enclosure to enable the bag to be moved;
   a handle for dragging and guiding the bag;
   said connection members being movable between a rest position in which the wheels lie in proximity to said enclosure, and an operative position in which the wheels are distanced from said enclosure;
   substantially rigid protection elements for at least partly housing the two lateral faces and the circular contour of each of the wheels when said wheels are in the rest position;
   said enclosure having at least one substantially rigid base wall;
   said protection elements being positioned external to said enclosure and extending outward beyond vertical sides of said enclosure;
   said connection elements being structured and arranged such that, when in the rest position, the connection elements are positioned external to said enclosure; and
   said support structure extending from the base to the upper edge of the enclosure, and being shaped to bound a portion of the lateral wall of the enclosure.

2. The bag according to claim 1, wherein,
   said protection elements comprises shells open at a base of the bag so that, when the wheels are in the rest position, the wheels rest on the ground, allowing a user to drag and guide the bag with the wheels inside the protection elements.

3. The bag according to claim 1, wherein,
   said protection elements comprises shells open at a base of the bag so that, when the wheels are in the rest position, the wheels rest on the ground.

* * * * *